Jan. 24, 1956  E. F. MOGREN  2,732,543
FISHERMEN'S INDICATING LIGHT
Filed June 30, 1951  2 Sheets-Sheet 1

INVENTOR.
Eben F. Mogren
BY
Robert M. Dunning
ATTORNEY

Jan. 24, 1956 E. F. MOGREN 2,732,543
FISHERMEN'S INDICATING LIGHT
Filed June 30, 1951 2 Sheets-Sheet 2

INVENTOR.
Eben F. Mogren
BY
Robert M. Dunning
ATTORNEY

2,732,543

FISHERMEN'S INDICATING LIGHT

Eben F. Mogren, Weaver, Minn.

Application June 30, 1951, Serial No. 234,509

7 Claims. (Cl. 340—213)

This invention relates to signaling devices and pertains more particularly to an illuminatable signalling device for fishermen.

In some types of fishing it is desirable to leave the fishing line unattended, the fisherman remaining only in the general vicinity of the line. In such instances it is desirable that some indicating means be employed to relieve the fisherman from the task of having to continually return to the line in order to check as to whether a fish has been caught. Although my device is not limited to ice fishing, ice fishing does present a situation where my device will find considerable utility, for in this type of fishing it is customary for the fishermen to string their lines at various points and then congregate in a centrally located warming hut. When using my signalling device, it becomes unnecessary for the fishermen to leave the hut until the proper signal has been displayed, showing that a fish has been caught.

Accordingly, one important object is to provide a signalling device that may be easily viewed from a distance.

Another object is to provide a device of the foregoing character that is suitable for both day and night fishing.

A further object of the invention is to provide a signalling device that can be sensitively balanced to indicate when very small fish have been caught.

A still further object is to provide a device of this type that can be inexpensively fabricated and which is susceptible to utilizing for the most part a flashlight of conventional construction.

It is also within the contemplation of the invention to use my device for other purposes ancillary to properly signalling when a fish has taken the line, such uses including the baiting of the fish hook at night and the steering of a boat when returning from a fishing expedition.

Still other advantages and uses will become apparent from a reading of the following written description and a study of the accompanying drawings, in which.

Figure 1:
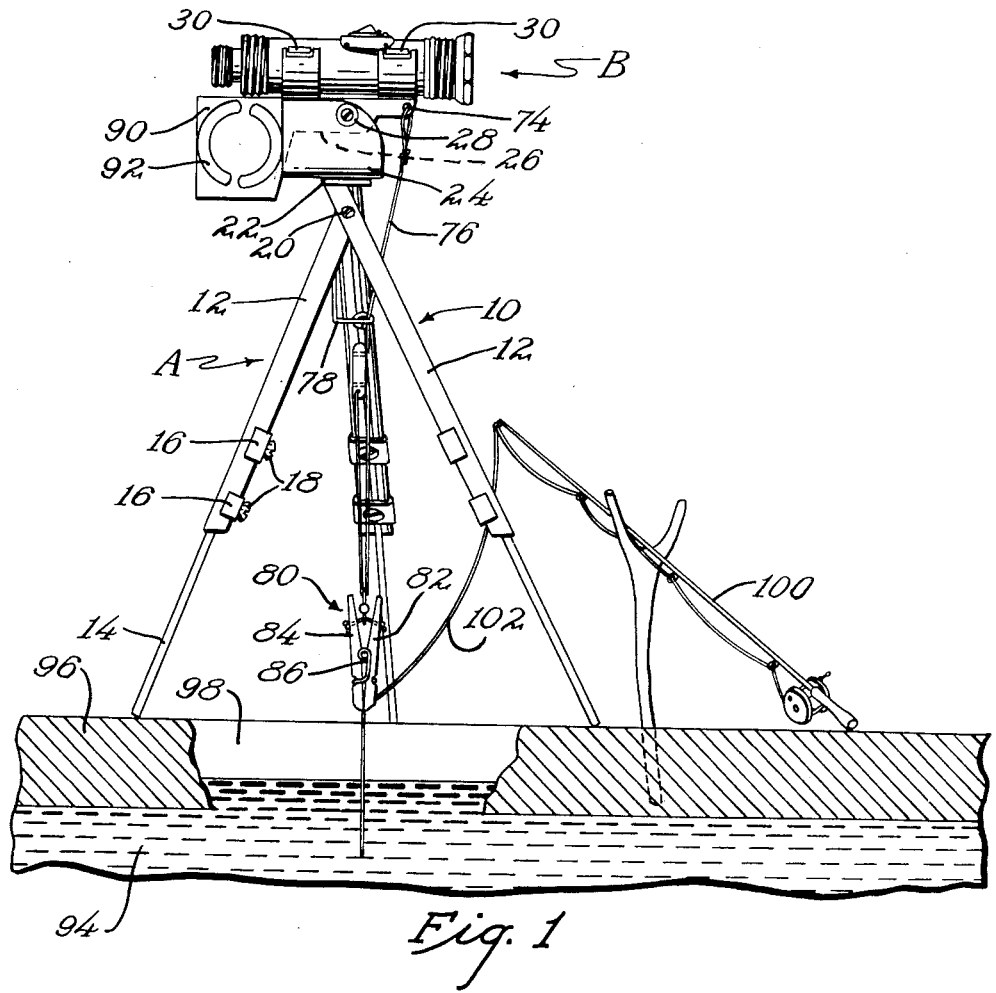
Figure 1 is an elevational view of my apparatus as used in ice fishing.
Figure 2:
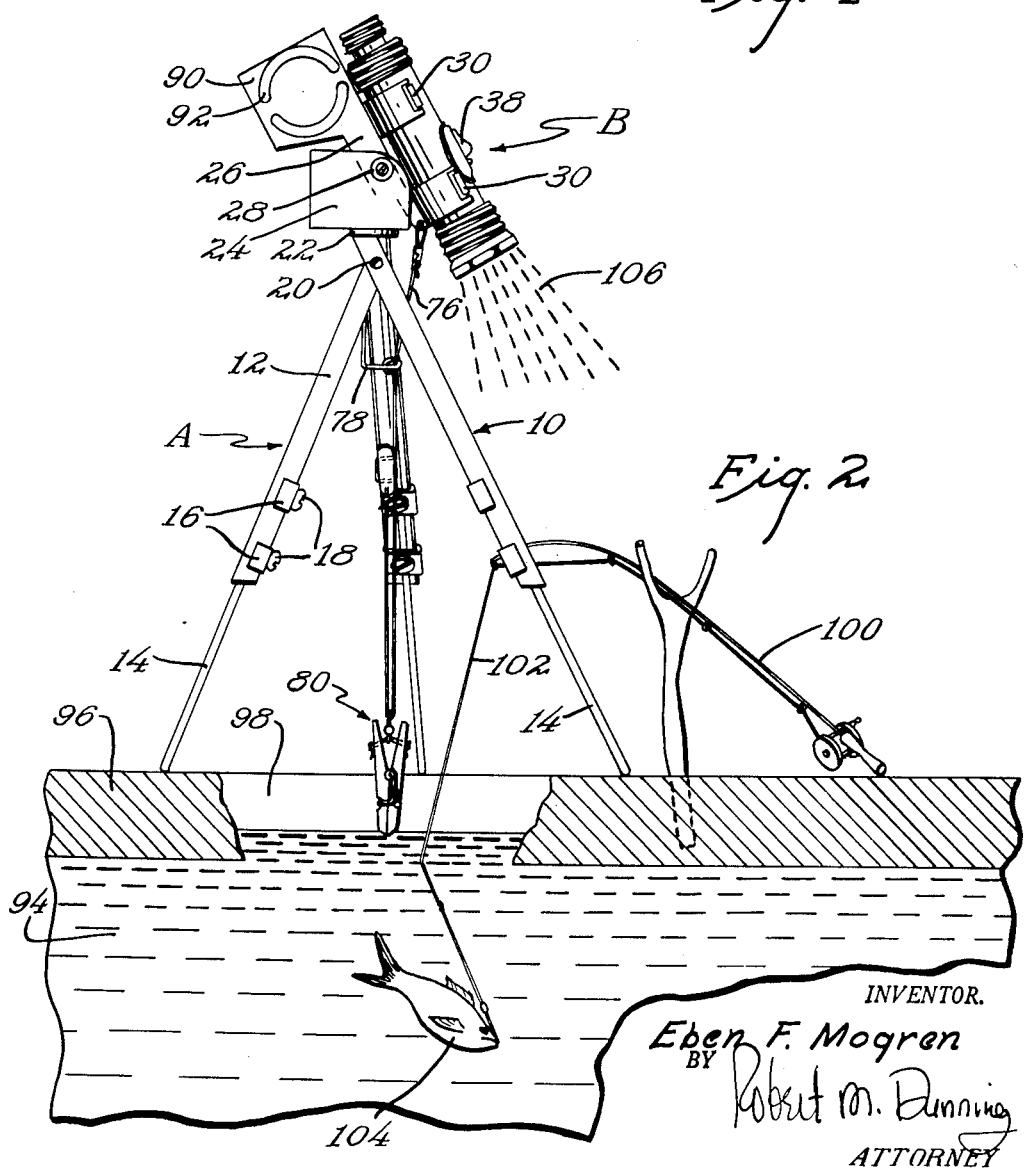
Figure 2 is a view similar to Figure 1, but with the device shown tilted by virtue of a fish having taken the hook.

Referring now to Figures 1 and 2 of the drawings, it will be seen that my apparatus includes a stand A and a modified form of flashlight B. The stand A comprises a tripod designated generally by the reference numeral 10. The tripod 10 is composed of several legs, each including a channel member 12 and an extensible element 14 telescopically received by the channel member 12. In order to retain the elements 14 in an adjusted position, I weld or otherwise secure a pair of U-shaped bridging members 16 on the elements 12, each bridging member 16 carrying a set screw 18 engageable with a portion of the extensible element 14. The channel members 12 are connected together near their upper ends by a bolt or pin 20.

Superimposed upon the upper extremities of the channel members 12 is a bearing plate 22. The plate 22 serves as a vertical thrust bearing for a swivel member 24 which may be channel shaped. By making the swivel member channel shaped a suitable pin (not shown) may be inserted through its base or bridging portion while the sides thereof serve as a clevis support for the tiltable element 26, a bolt or pin 28 providing adequate pivotal connection between the swivel member 24 and the tiltable element 26.

Figure 3:
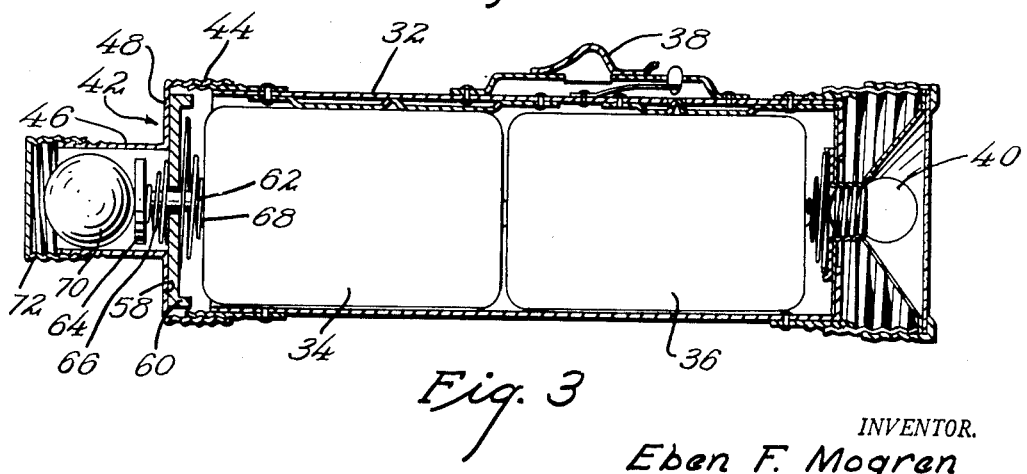
Figure 3 is a sectional view taken longitudinally through a flashlight provided with my special weight actuated switch means.

Mounted on the tiltable element 26 is a pair of resilient U-shaped clamps 30 which detachably hold the modified form of flashlight B. As a basis for a later understanding of the operation of my apparatus, reference should now be had to Figure 3 which is a longitudinal sectional view taken along the center line of the flashlight B. The construction of the flashlight B is mostly conventional, the conventional portion including a tubular body 32 in which is contained a pair of cells 34 and 36. On the outer surface of the body 32 is mounted a slidable switch 38 which is in circuit with the cells 34 and 36 and a bulb 40.

Instead of the usual end cover, I employ an attachment comprising a housing 42 having a sleeve portion 44 which threadably engages the left end of the flashlight body 32, a second sleeve portion 46 and a vertical wall 48 connecting between the two sleeves 44 and 46. As will presently become more apparent, the parts 44, 46, and 48, preferably integrally fabricated, are of metal. Within the sleeve 44 there is placed a centrally apertured insulating disc 58 having a peripheral flange 60 thereon. Slidably supported by the disc 58 is a metallic plunger 62 provided with an enlarged head 64 at one end. Interposed between the head 64 and the disc 58 is a coil spring 66 which serves as a biasing agency to urge the plunger 62 to the left or away from the cell 34. A second coil spring 68, which spring is customarily found between the usual end covers of flashlights and the rear most cell, supplies sufficient force to assure good electrical contact between the cells 34, 36, and the bulb 40.

Within the sleeve portion 46 there is inserted a metallic ball 70 which may roll into contact with the head 64 on the plunger 62 to overcome the biasing action of the relatively weak compression spring 66. In this way the plunger 62 may be urged into contact with the rear most cell 34 when the flashlight is tilted to complete or serial electrical circuit via the cells 34 and 36, the plunger 62, the ball 70, the housing 42, the switch 38 (previously moved to closed position) and the bulb 40 to thereby light the latter. As will hereinafter be pointed out the flashlight B will have other uses in which the bulb 40 will be necessarily kept lit. Accordingly, I employ a threaded cap 72 which may be screwed against the ball 70 to thereby move the ball and plunger 62 so that the plunger is maintained continuously in contact with the cell 34 until the cap 72 has been backed off from its engagement with the ball 70.

With the foregoing in mind it will be understood that the modified flashlight B may be inserted in the clamps 30 so that the slightest tilting force will cause pivoting of the element 26 and the consequent movement of the ball 70 and the plunger 62 to complete the lighting circuit. To transmit the requisite pulling force to the element 26, I provide an aperture 74 or other attaching means on the tiltable element 26 to which an auxiliary line 76 may be fastened. To assure that the line 76 will be pulled in a downward direction, an eyelet 78 is affixed to one of the channel members 12, the line 76 passing therethrough. At a preferred location on the line 76 there is attached a releasable clamp 80, for the purposes of illustration comprising a pair of jaws 82 and 84 biased to closed or clamping engagement by a spring 86. In the depicted arrangement in order to provide vertical adjustment of the clamp 80, one end of the line 76 is attached to a slip element 88 through which an intermediate portion of the line is passed to provide a loop for the convenient attachment of the clamp 80. It will be seen from Figure 1 that the flashlight B is normally horizontal, a downwardly extending flag portion 90 on the tiltable element 26 serving to effect the desired horizontal relationship and at the same time aiding, during daylight hours, the fisherman in detecting when the element 26 has been tilted, for bright colored markings 92 may be painted on the flag 90.

While it is to be expressly understood that my apparatus is equally suitable for shore or bank fishing, I have pictured my device in Figures 1 and 2 as being used for ice fishing. In these figures the reference numeral 94 represents the body of water and the numeral 96 designates the ice having an opening 98 therein. The tripod or stand A is designed to straddle the opening 98 and it will be observed from Figure 1 that a rod and reel 100 is placed near the opening, a fishing line 102 carried by the rod 100 being releasably clamped between the opposed jaws 82 and 84 of the clamping member 80. When a fish 104 takes the hook affixed to the free end of the fishing line 102, it exerts a tugging or pulling force on this line which is transmitted to the element 26 via the clamp 80 and auxiliary line 76. In this way the element 26 and the flashlight B are tilted and the flashlight becomes lighted by the gravitational movement of the ball 70, as shown in Figure 2, the rays 106 being clearly visible at night, and the flag 90 and tilted relationship of the flashlight A being apparent in the daytime. In some instances the rays 106 will also be visible in the daytime, and if desired a colored lens may be utilized to make the lighted flashlight more discernable.

Figure 4:
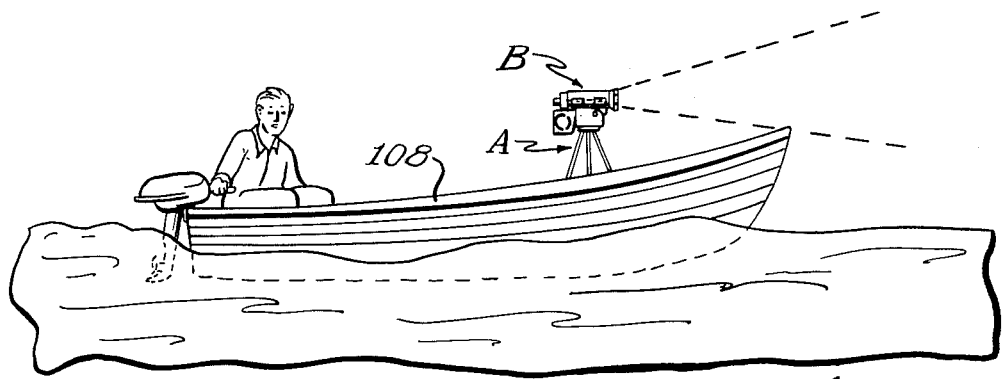
Figure 4 is an elevational view of my device showing a secondary use therefor.

It is within the purview of the invention to render the component parts of my apparatus as generally useful to fishermen as is possible. In this connection it will be appreciated that the support A and the flashlight B may be manually tipped into the position illustrated in Figure 2 to provide proper illumination for baiting the line 102. By virtue of the cap 72 the flashlight B may be handled and used just like any ordinary flashlight, tightening of the cap 72 causing the electrical circuit to be completed through the bulb whenever the switch 38 is in "on" position. Also, by tightening the cap 72 the entire apparatus A and B may be readily employed for the steering of boats and the like. In Figure 4 I have shown the apparatus being so used in a boat 108, the flashlight B being easily rotated in the appropriate direction by virtue of the swivel connection between the members 22 and 24, the extensible elements 14 being adjusted by means of the set screws 18 to accommodate for the sloping boat bottom.

The foregoing description is furnished by way of illustration for the purpose of teaching a preferred structural arrangement and several of the uses derivable therefrom and not of limitation. It is therefore my intention that the invention be restricted only by the appended claims or their equivalents, wherein I have endeavored to claim the inherent novelty believed to reside in my apparatus.

I claim:

1. In combination a signaling device for fishermen comprising an adjustable leveling support, a vertically pivotal mounted flashlight carried by said support, said flashlight being normally balanced in a horizontal position on said adjustable leveling support, weight actuated switch means carried by said flashlight including a member capable of rolling between circuit opening and closing positions, and pressure releasable line clamping means associated with said flashlight from the horizontal position for causing tilting of said flashlight from the horizontal position when a pull is exerted on said line means.

2. In combination, a support, an adjustable flashlight leveling pivotally mounted member carried by said support, a flashlight having a weight actuated switch including a member capable of rolling between circuit opening and closing positions, clamping means on said member for detachably engaging a preferred portion of said flashlight to hold said flashlight balanced in a normally horizontal off-light position, said switch being actuated by pressure releasable line clamping means when said pivotally mounted member and flashlight are tilted at an angle with respect to the horizontal.

3. In combination a signaling device comprising a multiadjustable leveling support, a swivel element surmounted on the said support, a clamping member pivotally connected to said swivel element for rotation in a substantially vertical plane, a flashlight carried by said clamping member, said flashlight including an electrically conductive end housing containing a metallic plunger biased in a direction away from the rearmost cell of the flashlight, means insulating the plunger from said housing, and a metallic ball for overcoming the bias of said plunger when said clamping member and flashlight are tilted in said swivel to thereby complete an electrical circuit through said flashlight.

4. In a flashlight having a light bulb at one end, an attachment for the other end comprising an electrically conductive member provided with a sleeve portion for engaging said other end of the flashlight and a second sleeve portion having communication with the first sleeve portion, a metallic ball received in said second sleeve portion, a metallic plunger mounted for slidable movement in said member, a portion of said plunger being engageable with said ball and a portion of said plunger being engageable with a flashlight cell within the flashlight, insulating means insulating said plunger from said electrically conductive member, and spring means biasing said plunger in a direction toward said ball, the weight of said ball being sufficient to overcome the biasing action of said spring means when the flashlight is tilted.

5. The structure of claim 4 in which there is a cap element threadedly engaged with said second sleeve and engageable with said ball for overcoming the biasing action of said spring means.

6. An end attachment for a flashlight comprising an electrically conductive housing member adapted to engage one end of the flashlight, an insulating element received within the housing, the insulating element having an opening therethrough, an electrically conductive plunger slidably received through said opening, a coil spring interposed between said insulating element and one end of said plunger for urging said plunger in a direction away from that end of the housing member which is adapted to engage the flashlight, and a weight element received in the housing member in the path of the plunger for overcoming the action of said coil spring when the flashlight is tilted.

7. A flashlight comprising a metallic end housing, an electrically conductive plunger slidably contained in said end housing, insulating means spacing said plunger from the housing, and a metallic weight element for urging said plunger against a cell within the flashlight when said flashlight is tilted to thereby complete an electrical circuit including said housing, weight element and plunger.

References Cited in the file of this patent

UNITED STATES PATENTS

| Number | Name | Date |
|---|---|---|
| 1,358,639 | King | Nov. 9, 1920 |
| 2,354,279 | Ross | July 25, 1944 |
| 2,363,825 | Yardeny | Nov. 28, 1944 |
| 2,493,491 | MacMahon | Jan. 3, 1950 |
| 2,538,788 | Massino | Jan. 23, 1951 |
| 2,540,683 | MacLean | Feb. 6, 1951 |
| 2,567,777 | Massino | Sept. 11, 1951 |
| 2,580,074 | Cesar | Dec. 25, 1951 |
| 2,591,888 | Steffen | Apr. 8, 1952 |